Sept. 27, 1960 T. MAINARDI 2,953,815
MACHINE FOR THE MANUFACTURE OF TUBULAR CONTAINERS
Filed Aug. 11, 1958 9 Sheets—Sheet 1

INVENTOR.
BY *Enrica Mainardi*

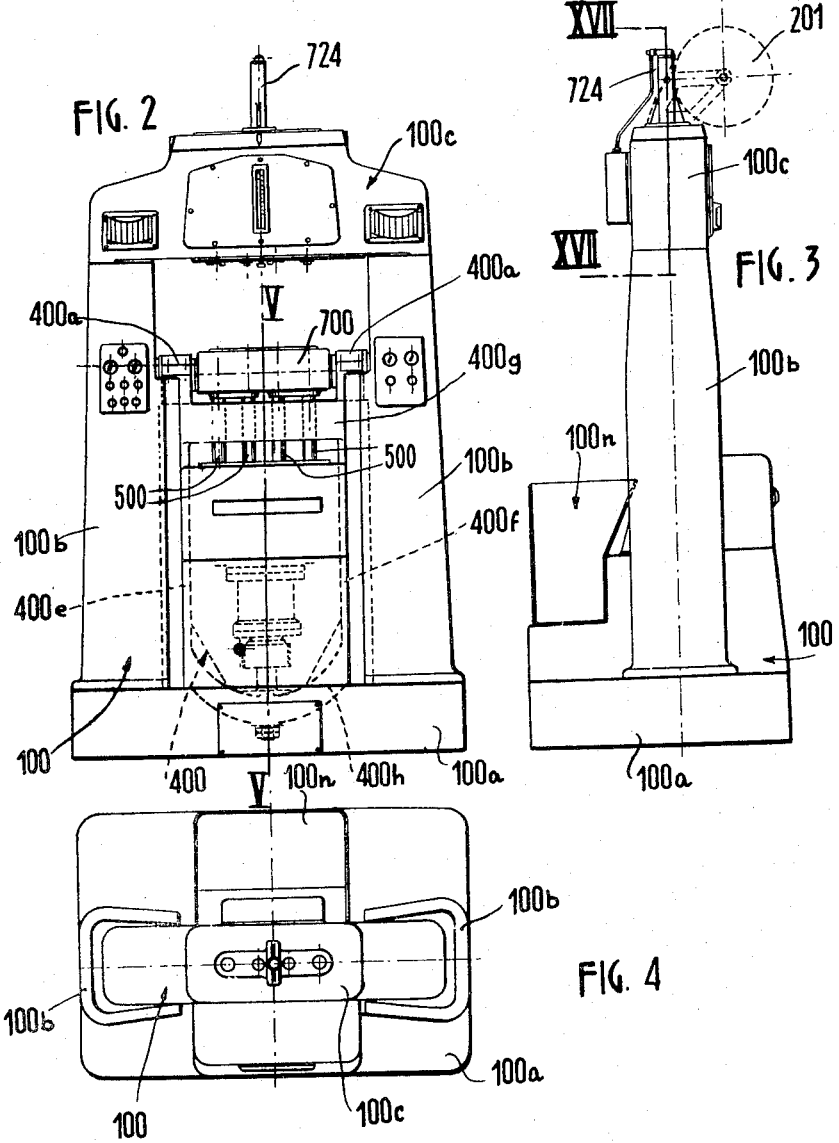

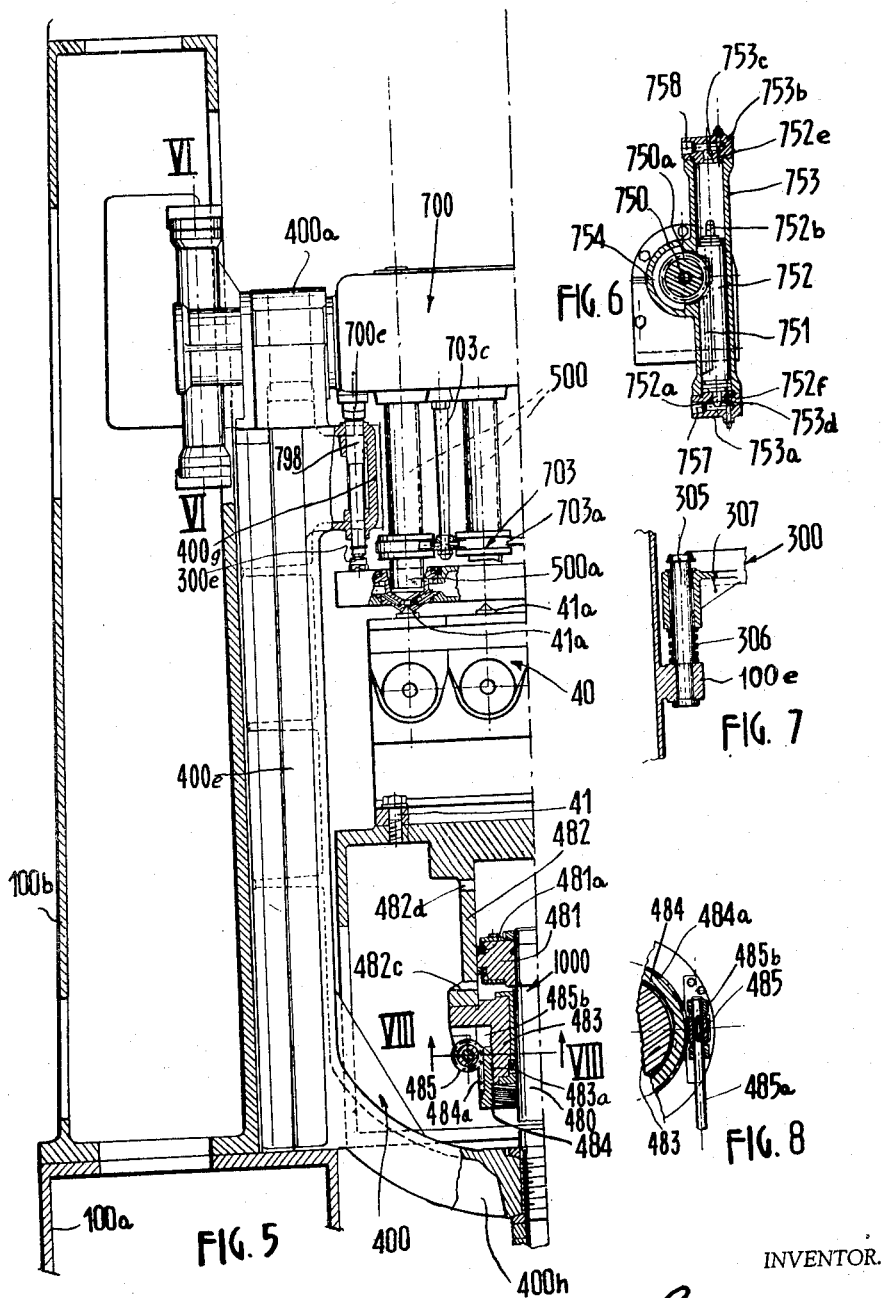

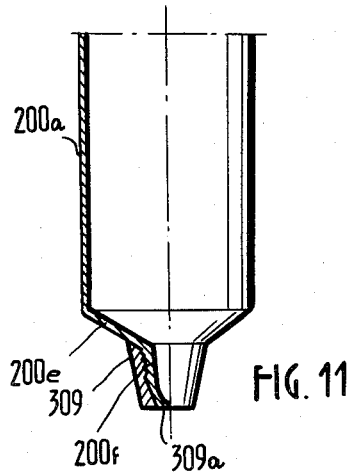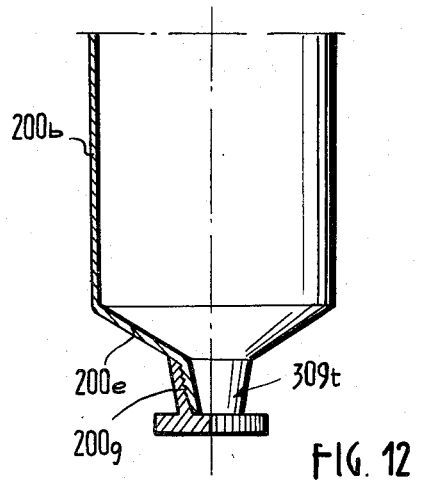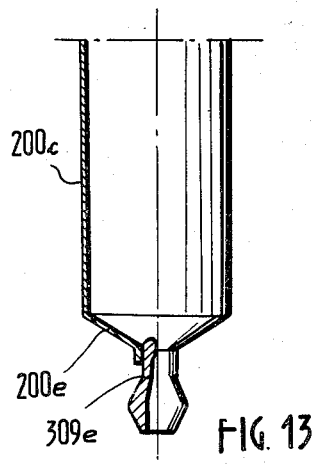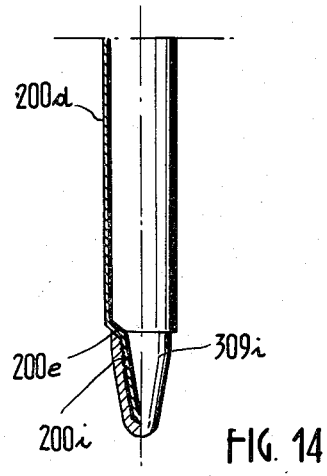

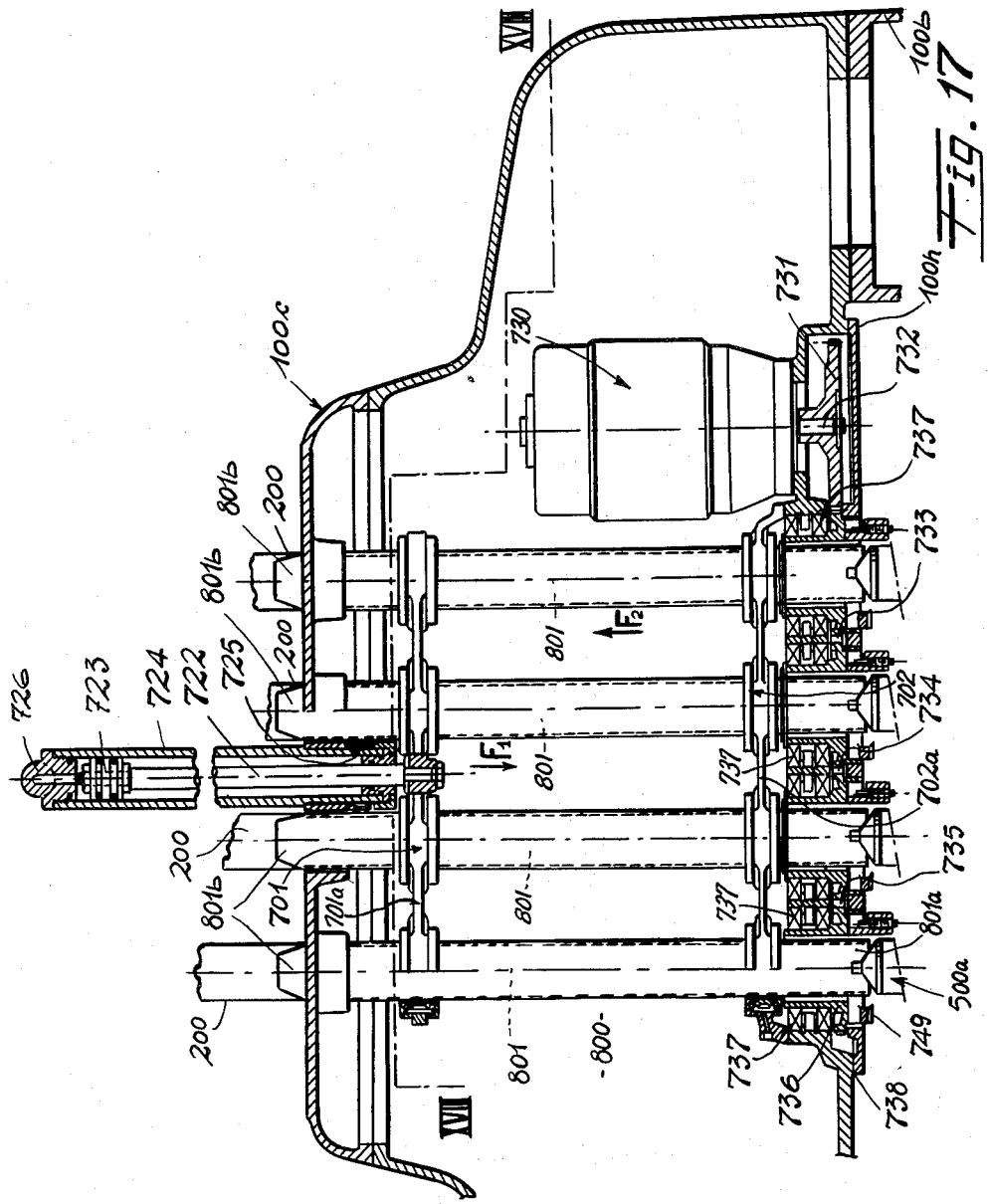

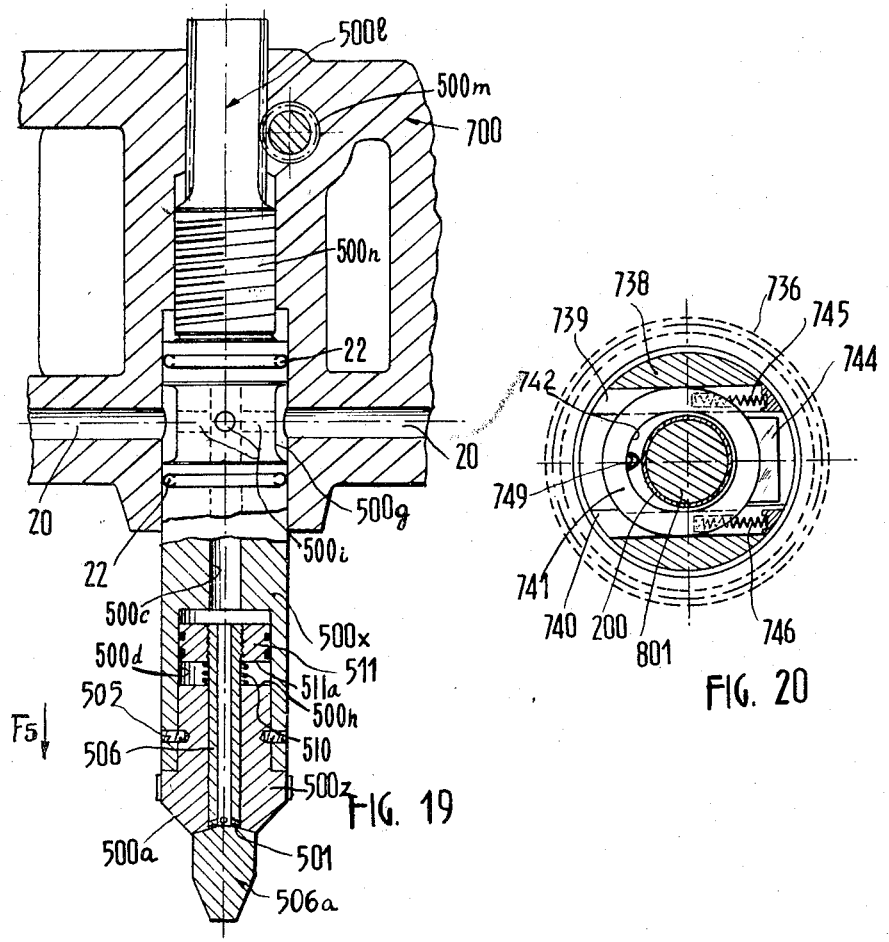
FIG. 19
FIG. 20
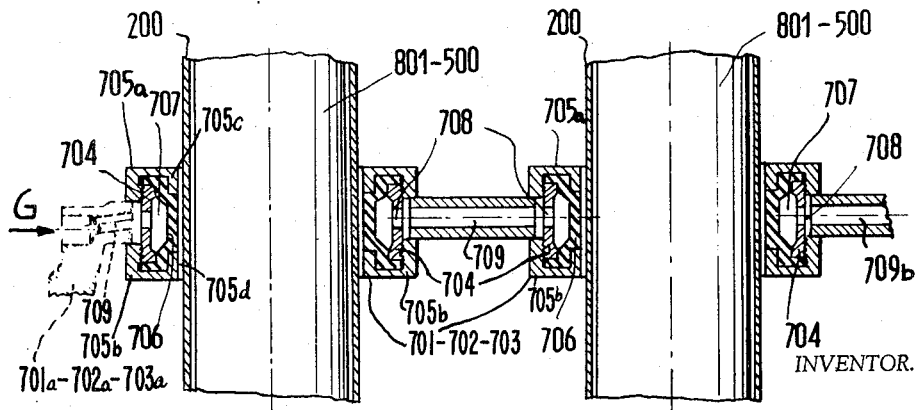
FIG. 21

United States Patent Office 2,953,815  
Patented Sept. 27, 1960

2,953,815  
MACHINE FOR THE MANUFACTURE OF TUBULAR CONTAINERS

Teresa Mainardi, Milan, Italy  
(% Ing. Armando Giambrocono, Via Durini 4)

Filed Aug. 11, 1958, Ser. No. 754,290

1 Claim. (Cl. 18—30)

This invention concerns a machine for the mass manufacture of collapsible containers, one portion of which is constituted of cuts of collapsible pre-manufactured tubes, for example, obtained through extrusion of plastic material such as polyethylene and similar substances. The shoulder and the head of the container are precisely formed by injection molding on which the container cap is placed.

Obviously this invention is extended to all the containers normally used to incorporate substances as toothpaste or alimentary preserves, pharmaceutical mixtures and similar substances.

The substantial aim of this invention is that of eliminating all those disadvantages of the automatic and semiautomatic machines, and essentially consisting in a relatively long manufacture time and thereby the high purchasing price, as well in the necessity of employing specialized workmanship and lastly in a working discontinuity.

For reaching the above aim this invention provides a machine for the manufacture of collapsible tubular containers made of plastics, by moulding to tubular flexible cuts the head of containers, comprising in combination a set of guide fingers freely housed in the frame of the machine; a feed and cutting device so as a set of flexible tubes are fed along and cut around said guide fingers; a set of mandrels fixed to a movable carrier and mounted to receive the said tubular flexible cuts fed by said feed device; a mould associated to an injection device of plastic material and mounted so as to receive the shaped heads of said mandrels; said mandrel heads operating as stop means for said guide fingers during the feed of said flexible tube; said feed means acting also as stop means for said guide fingers during the disengagement of the mandrel heads from the adjacent ends of said guide fingers.

According to a further feature the said feed device includes in combination a bracket; means for reciprocating along the machine frame said bracket so as to assume a lower position adjacent to and an upper position spaced from said mandrel heads; a set of elastically deformable rings associated with said bracket and surrounding said guide fingers; a source of pressurized fluid feeding said elastically deformable rings during the movement of said bracket from said upper position to said lower one of said bracket i.e. during the feed movement of said tubular cut.

According to another feature said movable carrier conveying said tubular flexible cuts from said guide fingers to said mould of said injection device comprises in combination a swinging cross-bar pivotally mounted in a reciprocating frame; means for reciprocating said frame along two standards of the machine, means for oscillating said cross-bar pivoted to said reciprocating frame so as to assume a first, a second and a third operative position; during said first position the mandrel heads abutting the adjacent ends of said guide fingers; during said second position the mandrel heads being housed into said mould; during said third position the mandrel heads projecting in a discharge tank for the moulded containers.

The invention aims at producing containers with their cap associated corresponding to the head of the collapsible tubes, as much as containers for which the shaping of the cap takes place in the same time of the shaping of the container head.

A preferred embodiment of this invention is hereinafter particularly described in connection with the annexed drawings, in which:

Figs. 2, 3, 4 are respectively a vertical, lateral and plan representation of the machine according to Fig. 1.

Fig. 5 is a partial representation in section according to the line V—V of Fig. 2 some parts being in view to better understanding of the invention.

Fig. 6 is a longitudinal section according to the line VI—VI of an hydraulic lifting jack able to cause the swinging cross-bar to swing corresponding to the said first, second and third positions of the said mandrels.

Fig. 7 represents a detail of the elastic bearing device of the mould substantially corresponding to the line VII—VII of Fig. 9.

Fig. 8 represents in section the detail of the device regulating the alternative upwards stroke of the already mentioned reciprocating frame.

Figs. 11–12–13–14 represent half in section half in view with their cap the collapsible containers to be produced with a mould as in Figs. 9, 10.

Fig. 17 represents the feeding device of the collapsible tubes according to a sectional view along the line XVII—XVII of Fig. 3, with some portions represented in view.

Fig. 18 is a sectional view according to the line XVIII—XVIII of Fig. 17.

Fig. 19 is a sectional view of a mandrel associated to the said swinging cross-bar as well a partial representation of this last one.

Fig. 20 represents in section a detail of the feeding device and concerned too with the automatic device cutting of the collapsible tubes.

Fig. 21 represents in sectional view a detail of the hydraulic device for the displacement of the collapsible tube along the guide fingers of the feeding device and of the core of the mandrels.

Figure 1:
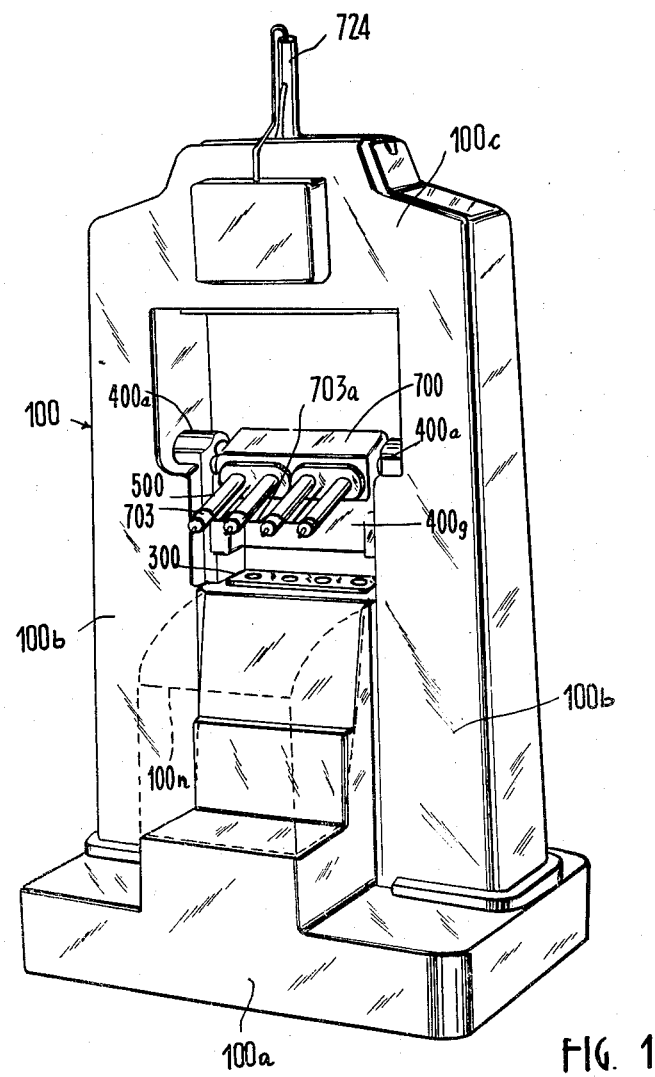
Fig. 1 is a perspective and schematic view of a machine according to the invention.

It is to be stated beforehand that some details of an obvious interpretation for an expert, will not be particularly explained in this description, not only for the purpose of a brief explanation, but also for not overlooking the matter claimed by this invention.

Also to better understand the invention, in the first part of the present description of the machine, a brief description of the same and of its operation will come first, giving in the following parts a detailed description of the elements; the present invention consists of.

*Part I.—Brief description of the machine and its operation*

Particularly referring to Figs. 1 to 4.

The machine according to the invention is essentially composed of a support frame, generically indicated by the reference 100 including a base 100a, two standards 100b, and finally a yoke 100c, the said portions being rigidly connected to each other and obtained preferably by casting.

Corresponding to the yoke 100c the feeding and cutting device 800 (Figs. 17, 18) of the plastic collapsible tubes 200 is associated.

Figure 15:
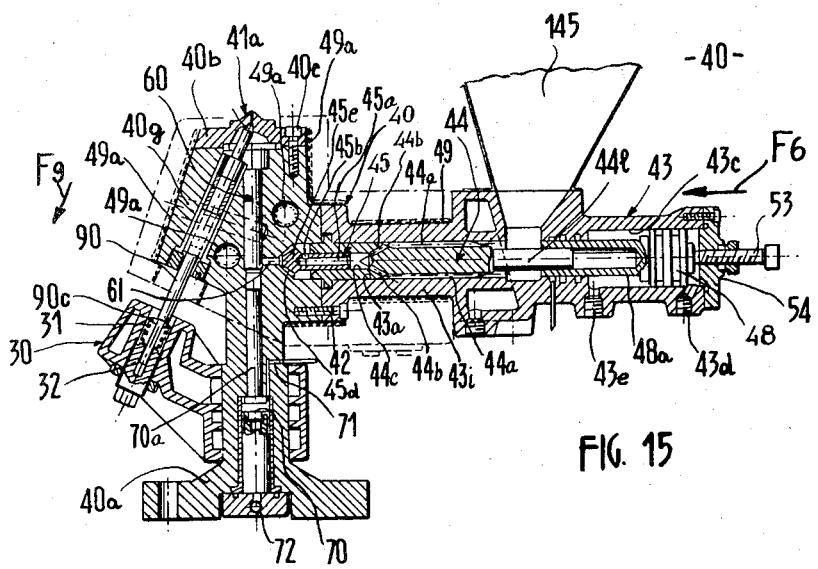
Fig. 15 represents an axial section according to the line XV—XV the injection device incorporated in the machine according to this invention.
Figure 16:
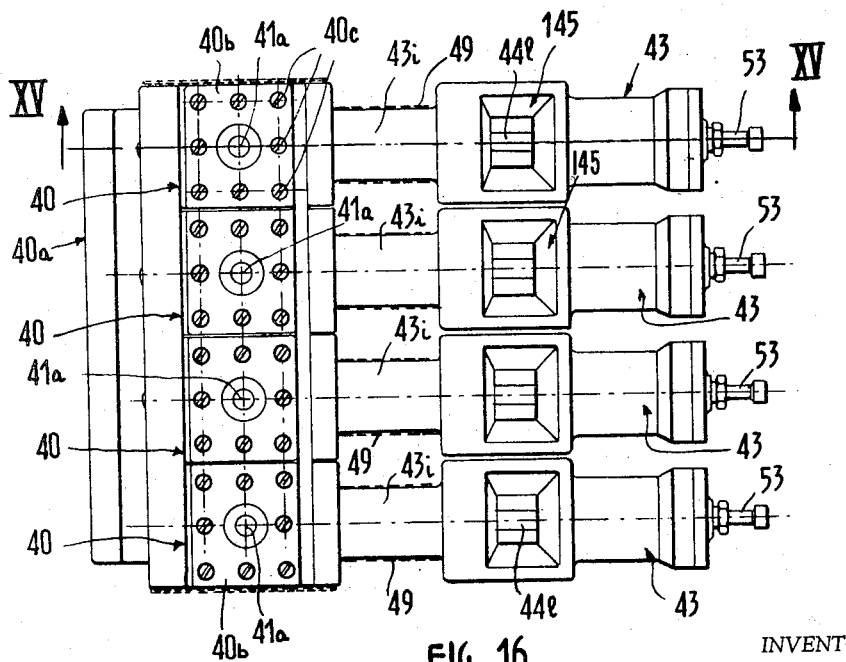
Fig. 16 is a plan representation of the whole injection apparatus one element of which has been represented in sectional view in Fig. 15.

Said device feeds a set of cuts of collapsible tube 200a, 200b, 200c, 200d, from a collapsible tube 200 coming from a set of bobbins 201 or directly coming from an extruding machine. As it obviously appears from the preamble of the description the said cuts of collapsible tube constitute the premanufactured portion of the containers respectively represented in Figs. 11–12–13–14 while the shoulders 200e, the container heads 200b, 200f, 200h, 200i, are shaped by injection of plastic material, particularly represented by Figs. 9, 10 and generally indicated by 300, and with the male dies which will be hereinafter mentioned as mandrels, and generally indicated by 500x, naturally by the intervention of the injecting devices (Figs. 15 and 16).

Figure 22:
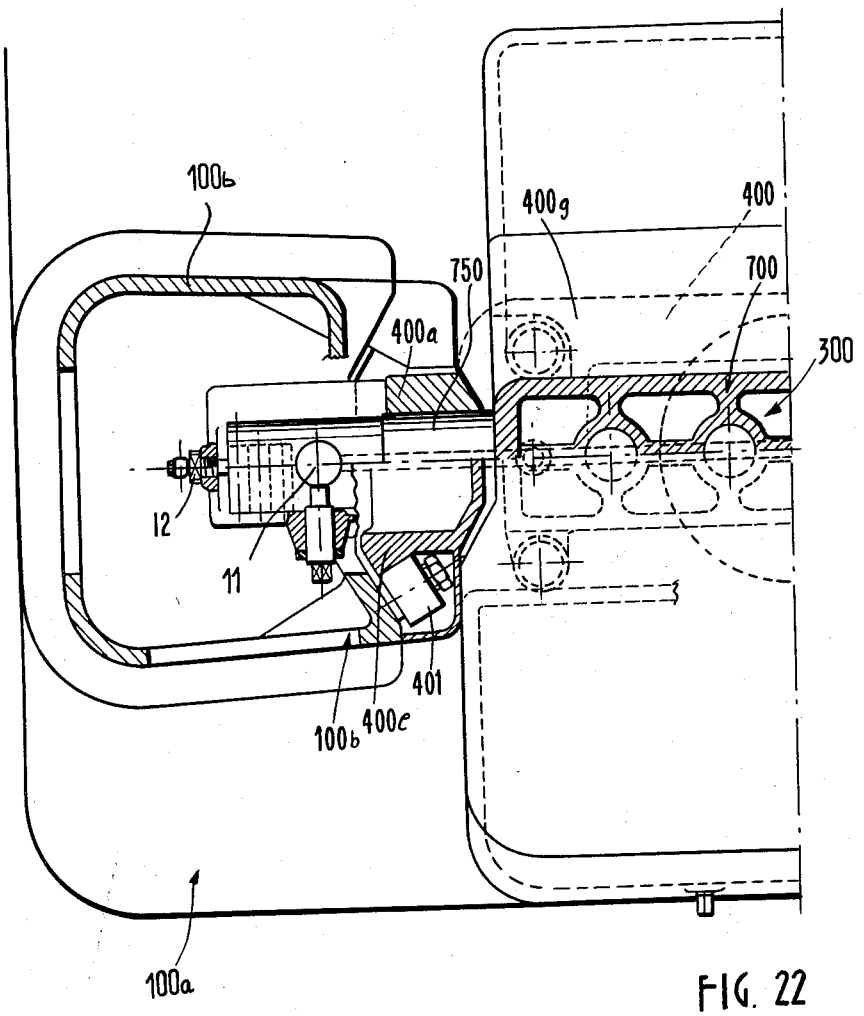
Fig. 22 represents a conventional transversal sectional view of the machine, concerned for a portion with the guide device of the reciprocating frame and for another portion with the pivoting of the swinging cross-bar with the reciprocating frame.

The latter are generally indicated by 40 and rigidly connected to the support frame 100 of the machine, through bolts 41 or other similar connection means (Fig. 5). Along the standards 100b (Fig. 22) and preferably in rolling contact through a set of rollers 401, pivoted to the standards a frame 400 is mounted to be reciprocated upwards and downwards the said frame substantially presenting a shape of a reversed A.

The ends 400a of the said frame, are pivoted corresponding to the ends of the swinging cross-bar 700; the latter is associated to the mandrels 500 and mounted to be swung through a device which will be described later, so as to take with the mandrels and in cooperation with the said frame three operative positions, pointed to in the preamble of the present description as first, second, and third positions.

More precisely in the first position the mandrel ends 500a are in vertical positions with the ends 500a engaged with the ends 801a of the guide fingers 801 of the feeding device 800.

Obviously during this first position, Fig. 17, the reciprocating frame 400, actioned by an hydraulic driving device 1000 (Fig. 5) particularly described hereinafter is in the position of highest rise.

The second position (Fig. 5) is precisely turned of 180° in regards to the first one, and obviously it takes place after the feeding device has fed the cuts of the collapsible tubes along the mandrel heads 500a. In order to obtain the said second position through the hydraulic driving device 1000, a small lowering of the frame 400 will be caused, then a rotation of 180° of the cross-bar 700, finally a further lowering, into the mould seats, and the latter is lowered so as to contact (Fig. 5) with the injection nozzles 41a of the injection device 40. It is to be noticed that (Fig. 7) the mould 300 is mounted so as to be shifted along four guides 105 fixed to the frame 100 and urged upwards (Fig. 7) that is, in a distancing position from the said nozzles by four springs 306, winded round the said guides 305 and normally compressed between projection (307) of the mould and a bracket 100e of the frame 100.

A direct contact of the mould with the nozzles is avoided in order ot allow for the mould a relatively cold temperature, which condition proved to be particularly propitious.

The passage from the second position to the third position substantially happens after an upwards shifting motion of the reciprocating frame 400, till the mould 300, following the reaction of the springs 306, distances itself from the head of the injection device and the mandrel ends 500 have been distanced from the corresponding seats of the mould.

Now the swinging cross-bar and thereby the mandrels, bearing at their ends the manufactured collapsible tubes, are turned clock-wise (Fig. 3) of 25°–35°, so to allow the discharge of the manufactured collapsible tubes in a collecting tank 100n following the impulse of a high pressure draught blown through nozzles 501 (Fig. 19) formed in correspondence of the mandrel heads. Afterwards the reciprocating frame 400 will undergo a slight lowering motion, at the end of which the swinging cross-bar 700 will continue the clock-wise rotation (Fig. 3) till the mandrels 500 assume a vertical position (diametrically opposite to that of the first position). A further and slight upward motion of the frame 400 (and thereby of the cross-bar 700) will immediately engage the mandrel ends 500 with the adjacent ends 801a of the guide fingers (Fig. 17); these ends 801a being shaped in a complementary way in regards to the mandrel ends 500a. The cycle will repeat itself indefinitely till the exhaustion of the tubes from the bobbins.

*Part II.—Description of the feeding-cutting-locking device of the collapsible tubes (Figs. 17, 18, 20, 21, 5)*

Especially referring to Figures 5 and 17, the present invention provides three sets of resilient rings to be operated by pressurized air, and generally indicated by 701, 702, 703, the said sets of resilient rings being connected between them through brackets 701a, 702a, 703a.

The bracket 701a is mounted so as to be reciprocated, while the bracket 702a is fixed to the frame of the machine and the bracket 703a is fixed to the swinging cross-bar through arms 703e.

The number of rings constituting the said sets is obviously equal to the number of mandrels; in the example each set consists of four locking rings, some of which are represented in detail in Fig. 21.

With reference to this figure, each locking ring includes a circular crown 704, connected by screwing to two locking rings 705a, 705b, each of them presents an edge 705c, 705d, between the said crown 704 and said locking rings 705a, 705b, and corresponding to the said projecting edges 705c, 705d, an annular elastic diaphragm 706 is fitted the transversal section of which presents substantially a U shape.

As clearly shown in Figure 21, between the said crown 704 and the said annular diaphragm 706, an annular room 707 is formed, which communicates through a set of openings 708, drilled in the said crown 704, with a source of compressed air; the latter feeds a duct 709 (compare arrow G) formed in the respective bracket, so as to feed each external ring of each set.

The said duct 709 is prolonged by the sections 709a, 709b, bored internally to the respective bracket.

It is easy to understand the feeding of compressed air corresponding into the said annular rooms 707 causes the expansion of the diaphragms 706, and thereby the locking of the collapsible tube 200 corresponding to the guide fingers 801 or to the mandrels 500, in dependence of the rings associated to the brackets 701a, 702a, or respectively to the brackets 703a.

With particular reference to the Figure 17 the collapsible tube 200 receives a downwards feeding motion (compare arrow F. 1) after having been introduced correspondingly to the tapered upper ends 801b of the fingers 801, through the bracket 701a, which is guided along slides 720, 721 (Fig. 18) fixed to the frame of the machine; the bracket 701a centrally connected to the stem 722, of a hydraulic piston 723 which reciprocates in a cylinder 724 fixed corresponding to the yoke 100c of the machine. In the said cylinder 724 are obtained (Fig. 17) two openings 725 and 726 corresponding to the two ends of the cylinder itself; the said openings communicate with a source of a fluid under pressure thus causing either a downwards motion (arrow F. 1) or upwards motion (arrow F. 2) of the piston 723 and thereby of the bracket 701a.

Precisely during the downwards motion of the bracket 701a, the resilient rings 701 of the bracket 701a, will receive the fluid under pressure thus allowing by a locking pressure the downwards feeding motion according to the arrow F1, of the collapsible tube 200, while obviously the rings of the bracket 702a are in a decompression condition, allowing the downwards motion of the collapsible tube.

On the contrary, during the upwards motion (compare arrow F2) of the bracket 701a, the rings of this last one will be in a decompression condition, while the rings of the bracket 702a will be in a compression condition, thus allowing a tight anchorage of the collapsible tube itself during the cutting operation of that portion of collapsible tube, which has been already introduced correspondingly to the upper end 500a of the mandrels 500.

Figures 9, 10:
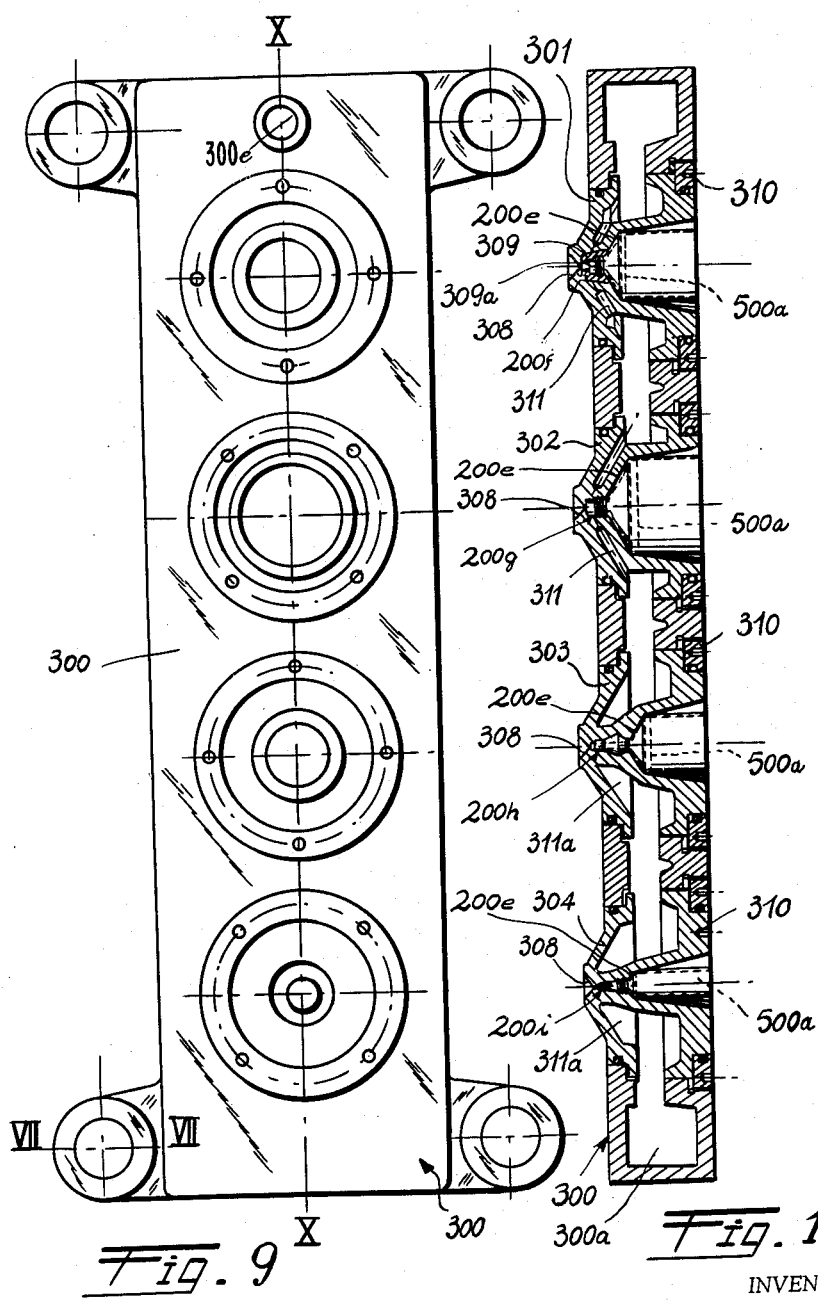
Fig. 9 is a plan representation of the mould.
Fig. 10 represents in axial section according to the mark X—X of Fig. 9 a mould conventionally represented for the manufacture of four types of different collapsible containers, which are represented in elevational view.

The rings 703 of the bracket 703a instead will be compressed during the extraction motion of the ready collapsible container from the mould 300, and this allows the extraction of the collapsible tube itself, in spite of the projecting section of container head as in the container types represented in Figures 12, 13, 14 (compare also Fig. 10). It is to be particularly noticed, with special reference to the embodiments as in Figs. 12 and 14, that the corresponding threading obtained in the mould members are shaped slightly bent upwards so to automatically compensate the deformation of the threadings formed in the container heads as consequence of the forced extraction of the collapsible tubes.

Obviously corresponding to the above mentioned third position of the swinging cross-bar 700, the rings 703 will appear decompressed so as to allow an easy discharge of the containers into the collecting tank 100n, under the action of the compressed air, blown in the mandrel heads 500a, through the nozzles 501 of the mandrels 500, as it will be better understood later on.

Naturally the control of the compressed fluid corresponding to the said rings will be regulated by a device synchronized with the motions of the cross-bar 700, so as to cause a cyclical sequence, as in the above mentioned sense, for the rings 701, 702, 703.

Such a device has not been represented or described because it can be realized according to several embodiments out of the scope of this invention.

I refer now particularly to Figs. 20 and 17, corresponding which the cutting device of the collapsible tube will be described.

A self breaking electrical motor 730, is rigidly connected to the yoke 100c, of the machine, and is able to trasmit through a gear 731 connected to the shaft 732 of the electrical motor, a rotation to the toothed crown 733, 734, 735, 736.

Said crowns are mounted on ball bearings 737, and mesh with each other as shown in Fig. 12.

A bored plate 100h, supports the said toothed crowns 733, 734, 735, 736, and in the same time centers the latter in cooperation with the ball bearing 737.

Each toothed crown (Fig. 20) for example the 736 one, is set so as to put in rotation a bushing 738 in which two guides 739, 740 are formed, along which an annular body 741 can receive a reciprocatory motion.

Said annular body presents in its central portion an ovoidal opening 742.

Corresponding to the said ovoidal opening 742 a point or a cutting tool 749 is fixed to the said bushing 738, while on the portion opposite to the application of the said point, an eccentric mass 744 is solid with the annular body 741.

A pair of springs 745, 746 keep the said point 749 at a radial distance from the adjacent surface of the fingers 801 and thereby from that of the collapsible tube 200. It is obvious that by causing through the toothed crown 736 a rotating motion of the bushing 738, and thereby of the annular body 739 the eccentric mass 744 will cause a radial motion of the point 749, thus letting the displacement of the annular body itself along the guides 739, 740 against the reaction of the springs 745, 746; finally the cut of the collapsible tube 200 is obtained, according to a cut of a pre-established length (compare also Figs. 11 to 14, references 200a, 200b, 200c). As the motor 730 is of a self-breaking kind, a few seconds after starting, it will automatically stop, thereby allowing the point 749 to separate from the collapsible tube 200, so that the cutting device automatically takes shape as in Figure 20, following the relaxation of the springs 745, 746.

*Part III.—Description of the swinging device of the crossbar 700, and of that of the reciprocating motion of the frame 400*

With particular reference to Figures 5 and 6 it will be noticed that the shaft 750 of the cross-bar 700 includes a toothed end 750a with which a toothed rack 751 can engage; the latter is formed from a piston 752, that can be reciprocated in a cylinder 753. The latter can be tightly fixed to the reciprocating frame 400 through a flanged sleeve 754.

Corresponding to the upper and lower bases 753b, 753a of the cylinder 753, two ducts 757, 758 are bored, that can alternatively communicate with a source of a fluid under pressure, obviously producing an upwards and downwards motion of piston 752, and thereby a clockwise or anti-clockwise rotation of the swinging cross-bar 700.

In order to relax the swinging motion of the cross-bar 700 corresponding to the respective stroke ends, the piston 752 presents at its two ends two axial extensions, respectively 752a and 752b, which fit in corresponding outlet openings 753c and 753d formed in the bases 753b and 753a of the cylinder 753.

Corresponding to these bases 753b and 753a, ports 752e, 752f, are bored, the cross-sections of which are smaller than those of the outlet openings 753c and 753d.

It can be understood thereby that either at the beginning either at the end of the piston strokes, that is when the extension 752a, 752b respectively fit in the openings 753c, 753d, a throttling of the inlet of the outlet of the fluid, is caused, and thereby a decrease in the angular speed of the shaft 750 of the cross-bar 700, as required for the cycle of operations described in the first part of the present description.

It will be noticed besides, that the shaft of the cross-bar 700 is hollow in order to allow the inlet of the fluid under pressure corresponding to the axial cavity 500c of the mandrels 500 and thereby to allow, as it will be better understood, hereinafter, the expulsion of the finished containers.

With particular reference now, to Figures 7, 8 it will be noted that the reciprocating frame 700 includes two standards 400e, 400f, a yoke 400g corresponding to which the swinging cross-bar 700 is pivotally mounted. As it has been already pointed out, the shape of the said frame, can be supposed to that of a reversed A.

Corresponding to the base 400h, the frame 400 (Fig. 5) is rigidly connected to a stem 480 of a piston 481, which is mounted slidable through a packing 481a into a cylinder 482; this last one is fixed to the injection device 40, as much as to an externally threaded (483a) flanged bush 483.

Corresponding to the threading 483a can be screwed a threaded sleeve 484, which externally presents an helicoidal threading; the latter can be turned externally through a driving rod 485a.

As better shown in Fig. 8 the said screw nut 485 is rotationally mounted corresponding to a bracket 485b fixed to the flanged portion of the bush 483.

It is obvious now that by turning rod 485a controlling the screw nut 485, the axial distance between the sleeve 484, and the bush 483 can be changed, this resulting in a variable and adjustable stop of the frame 400, corresponding to its upwards reciprocating motion.

The upwards motion of the frame 400 is obviously obtained by letting the under pressure fluid into a duct 482c formed at the base of the cylinder 482, while the downwards reciprocating motion is checked by the emission of the same fluid in correspondence to a duct 482d, obtained on the top of the cylinder 482.

With particular reference to Fig. 5 it is noted that the cross-bar 700 presents peripherically and laterally a shaper portion 700l, which during a part of the cross-bar rotation, and precisely during the end of its anticlockwise and downwards stroke (Fig. 3) engages the end of a driving rod 798, mounted slidable along the yoke 400g; the lower end of the said rod 798, is able to cause a downwards pressure on a knob 300l, fixed on the mould 300.

Thereby automatically during the stroke end of the swinging cross-bar 700, a lowering of the mould 300 will be caused, till the position shown in Fig. 5 is obtained. As above mentioned the downwards stroke of the mould 300, contacts against the springs 306 and carries the guides of the mould along the guide rods 305 fixed to the standards 100b of the machine.

Part IV—Description of the mandrels 500

With particular reference to Fig. 19 the head of each mandrel includes a bush 500z, fixed corresponding to the body 500x of the mandrel, by means of studs 505. The said mandrel presents an axial cavity 500c, in which a fluid under pressure can be fed from an opening 20 formed in the cross-bar 700; inside the said bush 500z a sleeve 506 can be reciprocated, the lower end of the latter presents a (moulding) shaping head 506a, fit for the manufacture of collapsible containers, according to the conventional kinds, shown by Figs. 11 and 12; the other end of said sleeve is threaded and engages a threaded portion of a piston 511, fitted slidable along a cylindrical cavity 500d, formed in the body 500x of the mandrel. As clearly shown in the drawing the diameter of cavity 500d is larger than the one of the axial cavity 500c. Between the lower surface 511a of the piston 511 and the free base 500h of the bush 500z, a spring 510 is mounted compressed, being wound round the sleeve 506. Corresponding to the connection point of the sleeve 506 with the shaping head 506a, a set of nozzles 501 are bored. The shaping head 506a presents a shape complementary to that adjacent to the bush 500z, so as to intercept the communication of the nozzles with the outside.

As above mentioned it is obvious that letting in compressed air through the axial cavity 500c a downwards displacement will be caused.

(Arrow F.5) of the piston 511 and against the reaction of the spring 510; thereby, the sleeve 506 will lower causing a disengagement of the shaping head 506a from the corresponding seat on the bush 500z.

The fluid under pressure can be let out of the nozzles 501 and run over the head of the collapsible container already extracted from the mould and associated to the mandrel head 500a, finally causing the expulsion of this last one, and thereby their discharge in the collecting tank 100n.

With particular reference to the upper portion of Figure 19, representing the upper part of the mandrel 500 and a portion of the swinging cross-bar 700, to which the mandrels are associated, reference 20 indicates a channel bored along the cross-bar 700 and to be fed by an underpressure fluid, by example compressed air coming from the union 11 provided near the bolt 12; the latter operates as a stopping bolt for the cross-bar 700. The said channel 20 opens in a tapered portion 500g, of the mandrel, in which a set of radial openings 500i are bored, so as to permit the communication between the duct 20 and the axial cavity 500c.

In order to allow an axial adjustment of the mandrel 500, its upper end 500l presents an helicoidal threading in which a screw nut 500m is engaged; the latter may be controlled from the outside.

At the bottom of the said helicoidal threading, the mandrel presents a threaded portion 500n so that it may be screwed in the cross-par 700.

It is obvious that by rotating from the outside the screw nut 500m, the screwing or the unscrewing of the mandrel in the cross-bar 700 is caused and thereby the external length of the mandrel is adjusted.

As the tapered zone 500g extends below and above the duct 20, the communication of the duct 20 with the radial ports 500i is naturally assured, and thereby the communication with the axial cavity 500c, in any required adjustment position.

Annular packings 22 assure the fitting of the body 500x of the mandrel, so as to avoid escape of compressed air.

Part V.—Description of the injection device

Reference is made particularly to Fig. 15 which represents in sectional view one of the four injection devices, constituting up the whole injection apparatus as in Fig. 16, being obvious that the number of injection devices is the same as the number of mandrels.

Anyway there is the possibility of employing one injection device, able to feed several injection nozzles of the plastic material for the shaping of the shoulders 200e and of the container heads 200f, 200g, 200h, 200i.

A support body 40a is provided, this one being fixed to the frame of the machine, and ideally divisible in four identical members, the longitudinal section of each of them being represented in Fig. 15.

Each member is connected by screws 42 to an extension 43 in which the plastication of the plastic material takes place. Said plastic material is introdced in a hopper 145.

In an axial cavity 43a of the extension 43, a flanged pin is fixed. The latter presents several peripheral grooves 44 communicating through internal radial grooves 44b in an axial opening 44c of the pin itself, in which a non-return valve 45 is mounted slidable.

The last one automatically prevents a return of the plastic material towards the hopper, i.e. in an opposite direction to the feeding one.

The pin 44 extends through the loading zone of the plastic material by a stem 44l, which serves as a guide for the hollow stem 48a of a piston 48 mounted to be reciprocated in a cylindrical hollow portion 43c of the extension 43.

Corresponding to the end portions of the cylindrical cavity 43c there are provided two unions 43d, 43e which allow alternatively the inlet and outlet of a fluid under pressure.

A screw 53 to be screwed in a cover 54 regulates the run of the piston 48.

Obviously the alternate motion of the piston 48 is caused by the inlet of the fluid under pressure alternatively, corresponding to the said unions 43e, 43d. The reciprocating motion of the stem 48a under the hopper 145 causes the feeding of the material to be plastic made toward the said grooves 44a while electrical heaters 4g, externally fixed round the front portion 43i of the extension 43 keep a temperature of plastification checked by a non-represented thermostat, causing thereby the plastification of the plastic material round the pin 44. The plastic material coming in the cavity 44c in the pin 44, passes in an axial cavity 45a of the non-return valve 45, and thereinafter through a transversal part 45b bored in the valve body.

Finally the plastic material passes through radial grooves 45d in the head 45c, shaped like a double trunk of a cone, of the valve 45 and opens through a port 61 in a feeding duct of the nozzles 60; this duct is vertically obtained in the body 40a.

It is easy to understand that a motion of the valve 45 inside the cavity 44c following the reflux of the plastic material will intercept immediately and automatically the flux of the plastic material opposite to the feeding one following the stopping of the channel 45c of the valve in the room 44c of the pin 44.

Inside the said duct 60 is mounted slidable the stem 70a of a piston 70, which can receive a reciprocating motion upwards and downwards, following a fluid under pressure, which is alternatively fed and discharged through the ducts 71 and 72.

The alternate motion of the piston if synchronized with the other operative phases of the machine and obviously causes the feeding of the plastified material along the channel 60 towards the nozzles 41a.

Those last are preferably obtained in a plate 40b fixed through bolts 40c to said body 40a.

The nozzle 41a is usually plugged by a spear-valve 90 which is set running in a projecting portion 40g of the body 40a and in a sleeve 32.

This last one is connected to a bracket 30 fixed to the body 40a.

A spring 31 is mounted compressed between a shoulder 90c of the spear valve 90 and the said sleeve 32, so that the end portion 90a of the spear-valve 90 acts as a plug, by exerting an elastic pressure 28 corresponding to the inlet port of the nozzle 41a.

As mentioned above it is obvious that the spear valve 90 frees the passage of the plastified material through the nozzle 41 only when, under the latter a feeding pressure is caused following the alternate motion of the piston 70 and then of the stem 70a.

The interior of the bracket 30 is hollow, and is fed by a cooling fluid, so that the resilient properties of the spring 31 are not affected by the relatively high temperature kept in the body 40a heated by the electrical heater 49a, being checked by a non-represented thermostat.

As mentioned above the operation of the injection device incorporated to the machine, according to the invention, is as follows; the granular material introduced in the hopper 145 is fed along pin 44 through the stem 48a and following the motion, in direction of the arrow F6, of the piston 48.

The plastified material because of the electrical heaters 49 comes out in the duct 60 after having run through the peripherial grooves 44a the radial ones 44b, the cavity 44c, the duct 45a, the port 45b, the radial grooves 45d the port 61.

Because of the upwards motion of the piston 70, and thereby of the stem 70a, the plastified material is fed towards the nozzle 41a corresponding to which it pushes the spear valve in direction of the arrow and lastly it comes out of the nozzle towards the inlet port 308 of the mould, where the moulding of the shoulder and of the container head take place.

The spear valve 90 automatically blocks the nozzle 41a, as soon as the feeding pressure of the plastified material comes under a predetermined value; this happens in synchronism with the motion of the piston 70 and thereby with the operative phases of the machine.

*Part VI.—Description of the mould*

With particular reference to Fig. 10 the mould 300 substantially includes a hollow plate 300a run through by refrigerated fluid in order to keep a relatively low temperature as required in order to make possible a fast solidification of the injected material.

Corresponding to openings formed in the said plate 300a the mould members 301, 302, 303, 304 are placed; those ones have conventionally been supposed different from one of another so as to explain the manufacture of different types of collapsible containers (Figs. 11, 12, 13 and 14).

Locking rings 310 provide to block each mold member corresponding to the said plate.

References 308 indicate the inlet port of the plastic material coming from the nozzles 41a whereas; references 311, 311a indicate cooling cavities. The shape of the mould members generally is complementary to that of the container heads except for the realisation as in Figure 11, in which the bored cap 309 drilled at its base 309a operates as mould member for the container head (with exception of the shoulders).

In this embodiment the mandrel presents some zones directly in contact with the cap 309 so to let outlet ports to be made in the collapsible container head.

As mentioned above, the threadings of mould members according to the embodiments of Figures 11, 12 and 14, are slightly de-formed to compensate the deformation of the container head, during its forced expulsion from the mould itself; besides the said threadings are slightly cone-shaped to help in the extraction of the container after injection process.

With particular reference to the embodiment of Fig. 13 it will be noted that the head 200h of the container includes two cone-shaped parts one of which is extended by a cylindrical portion.

After the moulding of the container (compare Fig. 13) the container head is cut corresponding to its shoulder and reverted so as the cut portion may be used as a cap 309e.

The caps 209t, 309i are of the usual type already known in commerce, so that a detailed description does not seem necessary.

What I claim is:

Machine for the manufacture of collapsible tubular containers made of plastics by molding heads of containers to preformed tubular flexible cuts, comprising a frame, a set of guide fingers housed in said frame, a feed and cutting device associated with said guide fingers adapted to feed flexible tubes along said guide fingers and cut therefrom lengths of said flexible tubes to form tubular flexible cuts, a movable carrier mounted on said frame, a set of mandrels having shaped heads thereon fixed to said movable carrier, a mold carried by said frame and associated with an injection device adapted to mold heads on the tubular flexible cuts, means to move said movable carrier between a position in which said mandrels carried by said movable head are in alignment with the guide fingers and feed and cutting means to receive said tubular flexible cuts and a position in which the shaped heads of the mandrels are aligned with said mold so as to form a closed cavity for molding heads on the tubular flexible cuts carried by said mandrels.

References Cited in the file of this patent

FOREIGN PATENTS 511,601    Great Britain _____ Aug. 22, 1939